United States Patent [19]

Chandler

[11] 4,345,419
[45] Aug. 24, 1982

[54] SELF ADJUSTING, FLOATING, REEL BLADE MOWER

[76] Inventor: Noel Chandler, 3912 Santiago St., Sebring, Fla. 33870

[21] Appl. No.: 249,610

[22] Filed: Mar. 31, 1981

[51] Int. Cl.³ .............................................. A01D 55/20
[52] U.S. Cl. ......................................... 56/249; 56/294
[58] Field of Search ..................... 56/249, 249.5, 250, 56/251, 252, 253, 254, 294

[56] References Cited

U.S. PATENT DOCUMENTS 2,972,218  2/1961  Benson .................................. 56/249
3,685,265  8/1972  Horowitz et al. ..................... 56/249

FOREIGN PATENT DOCUMENTS 131118  1/1949  Australia ........................... 56/249.5

Primary Examiner—Robert A. Hafer
Attorney, Agent, or Firm—Barry L. Haley

[57] ABSTRACT

A reel blade mower that provides for proper reel blade contact pressure on the bed knife at all times without any system adjustment. The mower includes a free floating reel blade suspended on a pair of pivotal support arms that is not mechanically fixed to a rigid position, but that is free to move vertically relative to the bed knife. The overall force of the reel blade in contact with the bed knife (contact pressure) is determined by combining the downward vector from the weight of the blade system and the force vector generated by the rotary movement of the reel blades. The mower is not damaged by debris engaging the reel blade or bed knife which easily passes through.

3 Claims, 5 Drawing Figures

*Fig. 4.*
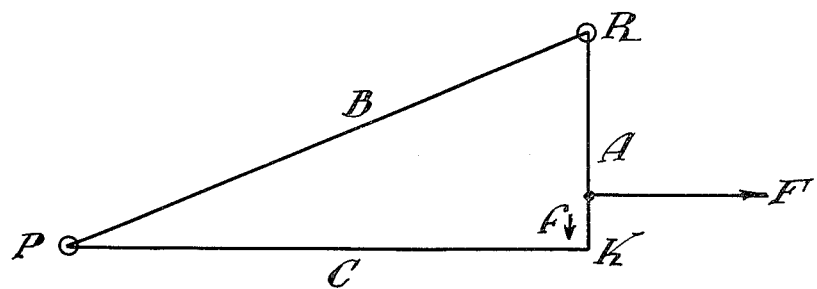
$$f = \frac{B^2 + A^2 - C^2}{\sqrt{4A^2 \times B^2 - (B^2 + A^2 - C^2)^2}} \times F$$
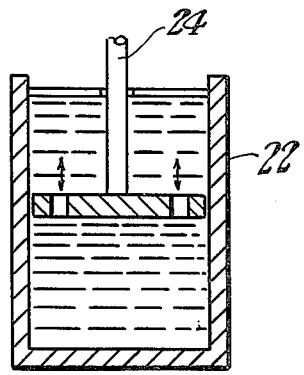
*Fig. 5.*

SELF ADJUSTING, FLOATING, REEL BLADE MOWER

BACKGROUND OF THE INVENTION

The invention relates to a mower that utilizes a reel blade and bed knife for cutting grass and the like. One of the primary problems in the past with reel blade type mowers is the constant adjustment required between the blades and the bed knife to insure proper cutting and to reduce excessive wear on the blade surface. In most mechanical reel blade mowers, the spatial relationship between the bed knife and the reel blade cutting edge is mechanically fixed by moveable, threaded connectors, that provide an adjustable but fixed contact pressure. Vibration, debris and mower movement usually change the contact pressure to an undesired value quite rapidly. To achieve consistent, proper adjustment in a conventional mechanical reel blade system, a person well versed in blade adjustment systems would have to constantly adjust and readjust the pressure between the blade and the bed knife. Ideally a light contact pressure is desireable.

Attempts have been made in the prior art to solve certain problems related to bed knife and reel blade wear and adjustment. For example in U.S. Pat. No. 2,896,390 issued to Cunningham, an automatic equalizer adjustment mechanism is disclosed for reel type lawn mowers. The purpose of the system described therein is to provide a movable bed knife that is counter-balanced by spring tension in engagement with the reel blade. Unfortunately, the problems in conventional systems in which the adjustments change due to the vibrations, rocks, or other debris also will affect Cunningham's automatic equalizer adjustment mechanism, thus still requiring adjustment to maintain the proper pressure along the bed knife. Another drawback is the complexity of the Cunningham system and the fact that it really does not provide self-adjustment or automatic adjustment of proper bedknife/reel blade contact pressure.

The problems of adjusting a single conventional reel blade mower (which are discussed in Cunningham's disclosure) are magnified at the commercial level when gangs of reel blade mowers are employed for cutting large grass areas such as golf courses. In such gangs of mowers, seven to nine reel blade mowers are not uncommon which thus requires seven or nine separate adjustments, each of which may need readjustment in a matter of minutes.

The present invention eliminates all mechanical adjustments between the bed knife and the reel blade, including rigid mechanical linkage heretofore known which required constant adjustment (or if improperly adjusted, resulted in undue wear to the system).

Another problem experienced with the fixed, mechanical reel blade/bed knife adjustment systems is that since the reel blade is mechanically coupled to the bedknife in a fixed relationship, debris encountered by the rotating blade can cause destruction of the blade by forcing debris between the blade and the bed knife. Improper mechanical adjustment can also warp the bed knife or the blades.

And yet another problem found in the fixed reel blade/bedknife mechanical systems is that for ideal mowing situations, the reel blade and bed knife should be adjusted differently, depending upon the heaviness of the cutting load or the thickness of the grass. Prior art mechanical systems had no provisions whatsoever for adjustment to compensate for different cutting loads other than a readjustment on site.

The present invention overcomes the problem of adjustment for different cutting loads by virtue of the fact that Applicant has determined that a floating reel blade, disposed at a proper pivot angle will cause the reel blade to bed knife contact pressure to increase (or decrease) depending upon the particular load. As far as potential debris damage, the floating reel blade will raise upwardly when contacting debris, allowing debris to pass through the lawn mower without destroying the blade.

SUMMARY OF THE INVENTION

A reel blade mower comprising a frame, a pair of front and rear rollers for supporting the frame, a reel having a plurality of blades mounted about a central shaft for rotation, a pair of reel support arms connected to the central shaft of the reel, said arms being pivotally connected to the frame, and a bed knife fixed to the frame, said reel being mounted on said pivoting arms so that the reel blades engage the bed knife at a predetermined proper contact pressure, during rotation of the reel.

The applicant has determined that mounting the reel having the cutting blades on a pivoting, parallel arms on each side so that the reel blades rest freely on the bed knife, with the pivot points below the center axis of rotation of the reel, provides the proper contact force in accordance with a predetermined geometrical and mathematical relationship resulting in proper contact pressure on the bedknife at all times.

The bed knife is fixed to the frame by mechanical means such as bolts at a predetermined attitude relative to the ground. The bed knife may be used to change the height of the grass ultimately cut by having different shimmed positions of the bed knife for different desired heights of grass. Thus to alter the resultant height of the grass when cut one would move the bed knife either raised or lowered by adding or removing shims and then reattaching the bed knife to the frame. Another advantage of the present mower is that the plane of the bed knife maintains a fixed attitude to the ground regardless of the cutting height adjustment because to alter the cutting height the bed knife is raised or lowered in parallel increments by shims. Shimming will produce parallel planes of the same attitude relative to the ground of the bed knife. This insures a quality of cut in that regardless of the cutting height adjustment position of the bed knife, the bed knife attitude remains fixed relative to the ground.

In operation, the reel housing the cutting blades is driven by a suitable rotational energy source (which in most instances will be a hydraulic motor) that turns the reel and blades at a particular rotational velocity and force. The applicant has determined that the rotation of the reel blades and the location of the reel relative to the system that supports the reel pivotally provides a vectorial resolution of forces on the blade tips during rotation relative to the bed knife cutting edge that insures the proper contact pressure between each blade surface and the bed knife cutting edge. The proper contact pressure is maintained regardless of the thickness of the grass being cut.

To prevent unwanted upward movement of the reel blades induced by movement of the mower over bumpy terrain or vibration, a dampening system may be included which is coupled between the frame and the free end of the reel supporting arms to dampen vibratory motion. Thus for different types of terrain or situations, any extreme oscillatory motion of the entire reel blade and the pivoting arm will be dampened by a fluid dampening system. The dampening system could be a moveable piston with a hole therethrough in a fluid filled chamber to allow fluid to flow from one side of the piston to the other in a restrictive fashion. A pair of pistons one for each support arm may be employed. This will allow movement of the dampening system but it will be definitely restricted by the rate of fluid flow through the pistons.

The contact pressure resulting on the bed knife can be determined from a force vector diagram. The vector diagram consists of a geometrical relationship from the pivot point to the center of the reel (called B) the distance from the central shaft of the reel to the edge of the blade measured radially (called A) and the ultimate distance from the pivot point to the cutting edge of the bed knife (called C). In utilizing these dimensions to arrive at the force (f) on the bed knife, a formula of:

$$F \times \frac{B^2 + A^2 - C^2}{\sqrt{4A^2 \times B^2 - (B^2 + A^2 - C^2)^2}} = f$$

F is the force generated perpendicular to the center of the reel shaft (distance A) to the cutting edge of the bed knife from the cutting resistance to grass or friction.

In the situation where downward force on the bed knife is perpendicular to the distance from the pivot point to the bed knife (if A is perpendicular to C) then the problem is greatly simplified. In that simplified case the force is equal to the tangent of the angle alpha×F where the angle alpha is the angle between B and C. The purpose of the formulas are to determine from known quantities a vectorial geometrical relationship in conjunction with the particular system as it is designed at the factory so that the ultimate bed knife to reel blade contact pressure (and force) can be readily ascertained and designed into the system.

Basically, in operation, in one embodiment the height of grass ultimately cut is selected through the particular shim distance that the bed knife is bolted relative to the frame. Other than for changing the desired length of grass cut by the mower, the system is ready for use and requires no adjustment of the bed knife and reel blades once it leaves the factory. Thus the initial parameters of the weight of the reel, blade and drive system, the dimensions achieved for the support arms and the pivot point utilized will determine the proper contact pressure on the bed knife.

It is an object of this invention to provide a reel blade lawn mower that eliminates any adjustment or fixed linkage between the reel blade and the bed knife while at the same time providing a system that maintains proper contact pressure at all times.

It is another object of this invention to provide an extremely reliable, noncomplex reel blade/bed knife lawn mower system that eliminates mechanical adjustment and maintains proper contact pressure across the bed knife.

And still yet another object of this invention is to provide an improved reel blade lawn mower that eliminates damage to the blades caused from debris or excessive wear caused by improper adjustment.

And still yet another object of this invention is to provide an improved reel blade lawn mower of which the quality of cut of the grass or lawn can be maintained in view of the fact that the attitude of the bed knife to ground is constant regardless of the height of cut set in the mower.

In accordance with these and other objects which will be apparent hereinafter, the instant invention will now be described with particular reference to the accompanying drawings.

BRIEF DESCRIPTION OF THE DRAWINGS

FIG. 4 shows a diagram representing the spacial relationships between the center of the reel blade (R) to the bed knife (A) and the pivot point (P) that are useful in establishing a force vector diagram to ascertain the reel blade force on the bed knife. or proper contact pressure between the reel blade and the bed knife.

FIG. 5 shows a side elevational view in cross-section of one dampening unit that can be used with the invention.

PREFERRED EMBODIMENT OF THE INVENTION

Figure 1:
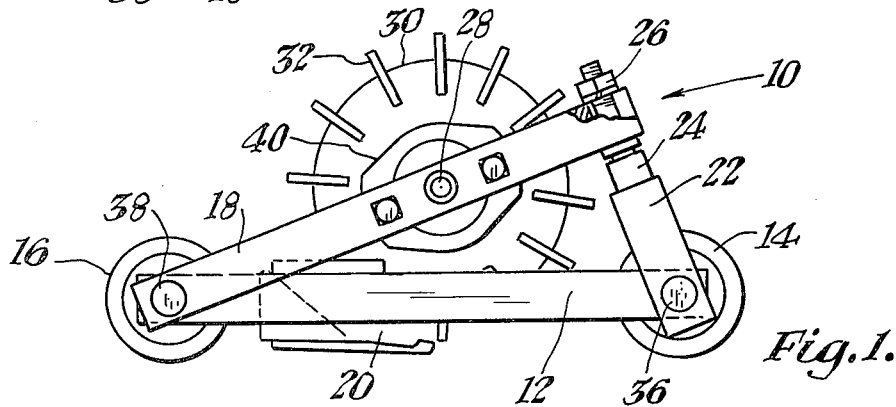
FIG. 1 shows a side elevational view partially in cross section of one embodiment of the present invention.

Referring now to the drawings and specifically FIG. 1 improved reel blade bed knife lawn mower is shown in principal without the actual hydraulic drive unit for the reel blade being affixed thereto generally at 28. The system includes a pair of rigid frame members 12 having rollers 14 and 16 attached at each end through shafts 36 and 38 respectively. The rigid arms 12 and the rollers and shafts form generally a frame. The bed knife 20 is affixed to the frame members 12 on each end with shims 42 (FIG. 3) and mounting bolts 44.

The reel 30 which has a plurality of conventionally shaped blades 32 mounted with spiders 30a around a central rotating shaft 28 which constitutes the reel shaft is mounted rotatably by bearing members 40 to a pair of parallel supporting arms 18 which are pivotally attached at one end (the lower end) to roller shaft 38. Thus the pivotal arms 18 are free to move about shaft 38.

A dampening unit 22 is affixed to the free end of the support arms 18 and to shaft 36, which includes a piston and fluid dampening chamber 22 described in greater detail below.

Figure 2:
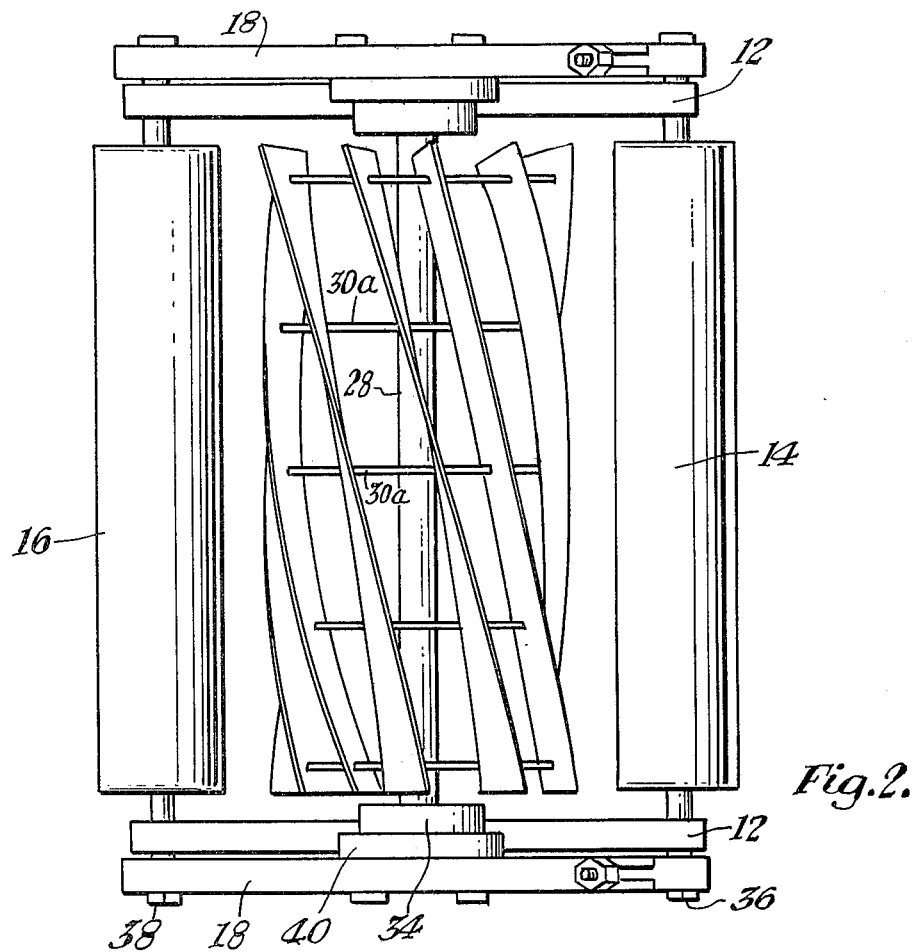
FIG. 2 shows a top plane view of the present invention.

FIG. 2 shows the relationship of the support arms 18 and the bearing connectors 34 and 40 which would also include in an operating model the hydraulic motor that is used to turn shaft 28 for operation of the device. The motor has been eliminated for the sake of clarity.

Figure 3:
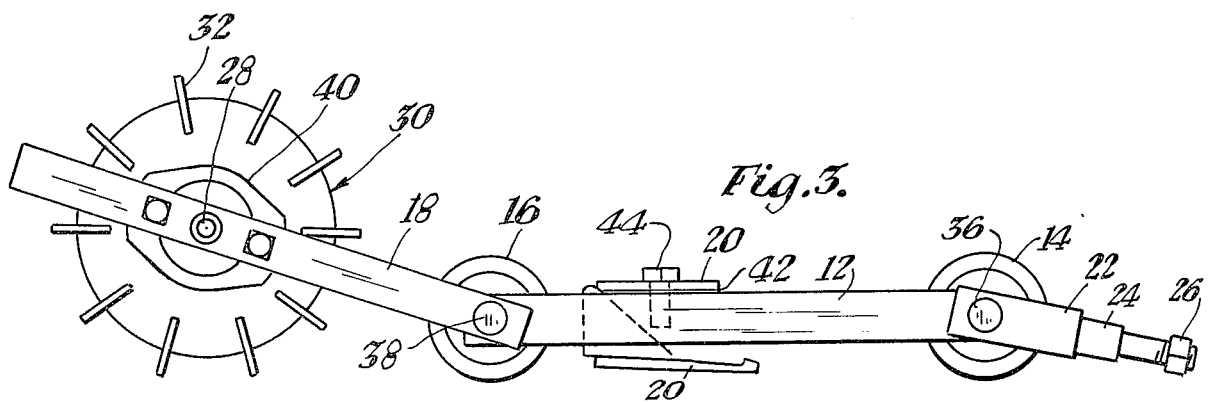
FIG. 3 shows a side elevational view with the reel blade moved to a non operational position.

FIG. 3 shows the free floating nature of the reel 30 and its relationship to bed knife 20 and the pivotal arms 18 in that in operation the reel blade is not mechanically fixed in any particular space relationship to the bed knife but in fact the entire assembly including the pivotal arms and the reel blades are free to move upwardly subject to the retarding movement of the dampener 22 and a linkage arm 24. The reel blade mower will in fact operate without the dampener which has been added merely to dampen out certain motions that could be encountered during operation.

FIG. 4 shows the vector relationship that establishes f which is the contact pressure or desired force resulting from the rotational movement of the reel blade and the pivotal support arms B between the pivot point which is in effect shaft 38 of FIG. 1 and the reel center shaft 28 shown as R on the vector diagram. K represents the contact point between the bed knife and the reel blade. When comparing the vector diagram shown in FIG. 4 and the operation in FIG. 1 as the reel blades 32 rotate and contact the surface of the bed knife different thicknesses of grass will be presented. Applicant has found that the pivotal action of arms 18 in conjunction with the force at the blade tip 32 varies depending on the thickness of grass to establish the proper bed knife contact pressure. For example, in thicker grass the blades pull harder against the bed knife to adjust for the increased thickness. The F force represents the reactive force to the rotating blades on the reel. As shown in the diagram B represents the distance from shaft 38 to shaft 28 while C represents the distance from shaft 38 to the bed knife tip of bed knife 20. As described earlier to determine f or the contact force if the distance from the center shaft 28 to the blade tip 32 at the bed knife K is perpendicular to distance C then the problem is greatly simplified.

FIG. 5 shows a dampener which has a chamber 22 and a linkage arm 24 with a piston at one end having holes through it and fluid contained to allow restrictive dampening movement of the piston and arm 24 which is connected in a resting fashion to the pivot arms 18 shown in FIG. 1.

Referring to FIG. 3 the bed knife 20 may be shimmed or adjusted upwardly or downwardly by the removal or addition of shims 42 to establish the proper relationship in height of the bed knife 20 relative to the ground. As shown in FIG. 1 the bed knife can be either raised or lowered which will establish the ultimate heights of the grass being cut. However because of the shim system the attitude or the angular plane of the bed knife relative to the ground will remain fixed regardless of the number of shims 42 added or subtracted from the system. This insures a quality of cut that is consistent regardless of the ultimate height of the grass cut.

It is important to realize that in this system in the design of the system at the factory, those parameters using the distance between the pivot point and the reel blade center shaft, the size and radius of the reel itself to the blade tip, and the location of bed knife in conjunction with the force generated by the rotating reel blade will be considered to arrive at the ultimate force desired. However when considering FIG. 1 it must be realized that the dampening unit which includes chamber 22 and linkage arm 24 are not mechanical adjustments and that in fact the reel 30 is riding in a floating free manner on the bed knife at all times.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A reel blade lawn mower that requires no adjustment between the reel blades and the bed knife to establish a variable, predetermined contact pressure for optimum cutting between the reel blade tips and the bed knife cutting surface, comprising:
    a frame;
    first and second movable support means connected to said frame;
    a reel having a plurality of cutting blades affixed thereto disposed about a central reel shaft;
    a bed knife attached to said frame;
    a means connected to the central shaft of said reel and said frame for supporting said reel pivotally against said bed knife, said reel and said reel central shaft support means being configured in weight, size and location to provide a predetermined blade tip contact pressure on said bed knife when freely vertically supported on said bed knife, said pivot located relative to said frame, said bed knife and said reel central shaft to produce an increased contact pressure above said predetermined contact pressure as a function of increased force on said reel blades resisting the motion of said reel blades.

2. A reel blade lawn mower as in claim 1, including:
    means connected to said pivotal reel support means for dampening any vertical motion of said reel.

3. A reel blade mower for cutting grass, lawns and the like and includes a reel having a plurality of blades and a bed knife, the improved mower requiring no adjustment between the reel blade tips and the bed knife cutting edge, the system establishing the proper contact pressure at all times on the bed knife, comprising:
    a mower frame;
    a pair of rollers mounted and connected to said frame for movably supporting said frame;
    a reel having a plurality of grass cutting blades connected thereto;
    a bed knife mounted on said frame;
    means for supporting said reel relative to said bed knife and said frame so that said reel is freely movable upwardly in a predetermined path relative to said bed knife at all times;
    means for shimming said bed knife relative to said mower frame at different locations to adjust for cutting height without altering the atitude of said bedknife relative to the material being cut; and
    means for dampening the vertical movement of said reel.

* * * * *